United States Patent [19]

Zahardis

[11] Patent Number: 5,130,608
[45] Date of Patent: Jul. 14, 1992

[54] ELECTRICAL MODULE AND METHOD FOR REDUCING POWER CONSUMPTION OF AN INCANDESCENT LIGHT BULB

[76] Inventor: Nicholas Zahardis, 2100 Linwood Ave., Fort Lee, N.J. 07024

[21] Appl. No.: 608,204

[22] Filed: Nov. 2, 1990

[51] Int. Cl.⁵ .................. H05B 37/02; H05B 39/04
[52] U.S. Cl. ................. 315/209 R; 315/219; 315/307
[58] Field of Search ............ 315/209 R, 208, 212, 315/219, 221, 224, 276, 254, 282, 287, 307, 206, DIG. 7

[56] References Cited

U.S. PATENT DOCUMENTS

| | | | |
|---|---|---|---|
| 3,737,808 | 6/1973 | Srivastava | 333/20 |
| 3,936,721 | 2/1976 | Butterworth | 315/224 X |
| 4,045,709 | 8/1977 | Morais | 315/208 X |
| 4,051,411 | 9/1977 | Knoble et al. | 315/208 X |
| 4,051,412 | 9/1977 | Knoble et al. | 315/208 X |
| 4,082,981 | 4/1978 | Morton et al. | 315/97 |
| 4,127,784 | 11/1978 | Proud, Jr. et al. | 307/311 |
| 4,296,296 | 10/1981 | Eichelberger | 315/105 X |
| 4,339,690 | 7/1982 | Regan et al. | 315/97 |
| 4,503,546 | 3/1985 | Yoshime et al. | 375/37 |
| 4,766,352 | 8/1988 | Widmayer et al. | 315/244 |
| 4,766,353 | 8/1988 | Burgess | 315/324 |

Primary Examiner—Eugene R. Laroche
Assistant Examiner—Ali Neyzari
Attorney, Agent, or Firm—Hopgood, Calimafde, Kalil, Blaustein & Judlowe

[57] ABSTRACT

The invention relates to a modular system and method for converting sinusoidal AC waves into a DC pulse train of extremely narrow pulse width which are amplified and directed to a fast switching power transistor. When the power transistor conducts, DC current flows from the module through the load for a time interval equal to the rectangular pulse width. The resting time between pulses, which is considerably greater than the pulse width, accounts for a significant saving in energy.

4 Claims, 2 Drawing Sheets

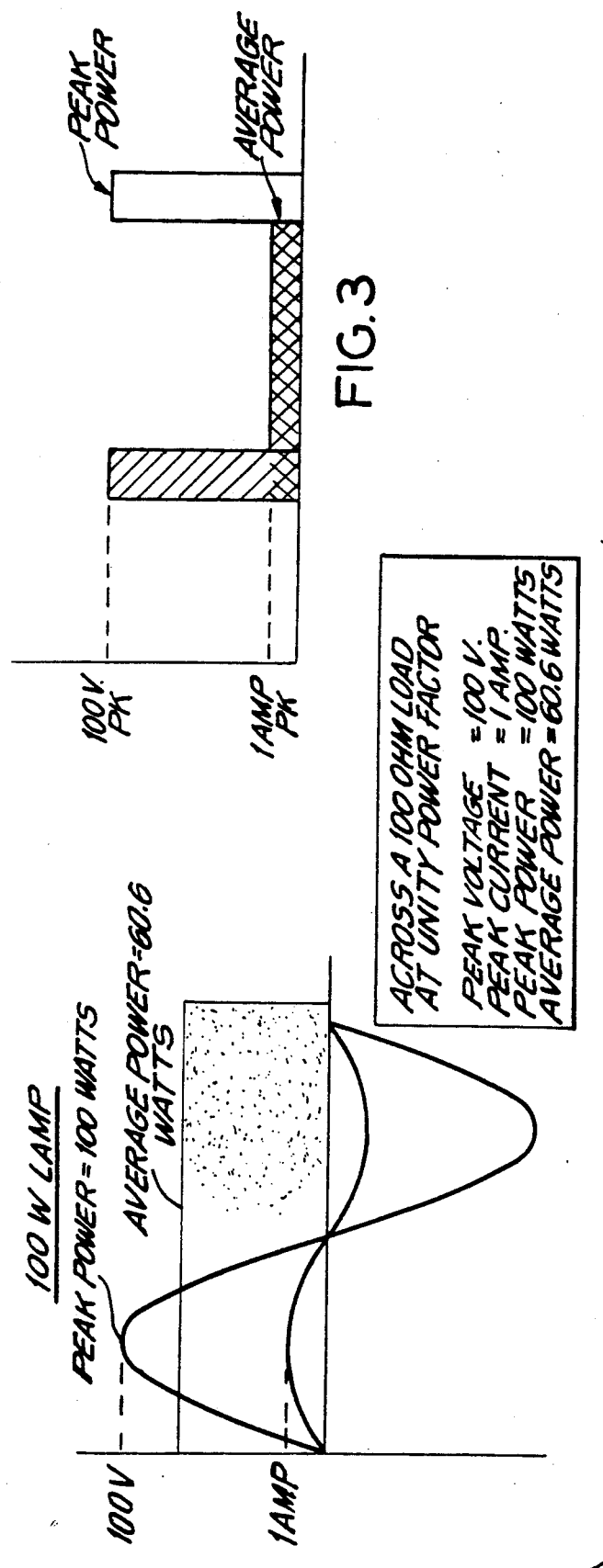

ELECTRICAL MODULE AND METHOD FOR REDUCING POWER CONSUMPTION OF AN INCANDESCENT LIGHT BULB

BACKGROUND OF THE INVENTION

This invention relates to reducing the consumption of electrical power necessary for the production of light and, more specifically, to a circuit module for converting AC current to a train of DC pulses flowing to a light-emitting load resistor.

In view of the ever rising cost of electrical power, there exists a commensurately growing need to find additional novel means for achieving energy savings by increased efficiency.

Various improvements have therefore been introduced since the advent of Edison's light bulb such as, to mention a few, using a tungsten filament and metal halide as incandescent material, coating the inner surface of the glass bulb or mounting the bulbs on specular reflectors. In addition, a power saving has been provided by the wide spread, if not universally desirable replacement of incandescent light sources by fluorescent lamps. The general objective has been directed to increasing the luminosity per unit electrical power consumed by improving the light-emitting load of a given circuit.

The purpose of my invention is therefore to provide a new power supply to reduce the consumption of electricity, by, more particularly, a low cost, small size and easily produced converting circuit for altering the conventional sinusoidal AC waveform into direct current voltages. The network according to my present invention generates a train of pulse waves of extremely narrow pulse width. These pulses are amplified and directed into a fast switching power transistor. When the power transistor conducts the pulse train, current flows through the load for a time interval equal to the pulse width which may be measured in nanoseconds or microseconds. Since the useful energy is expended mainly during the pulse width but not during the resting period between pulses, which is relatively much larger than the pulse width, yet too short to be perceptible to the human eye, considerable energy can be saved while nevertheless maintaining brightness of illumination. In other words, the light-producing ultra short DC pulses are selected sufficiently close in sequence (say 4,000 pulses per second) to prevent the human eye because of its natural retentivity, to discern the intervening resting or nonpulsed periods as shadows. As is well-known in the lighting art, fluorescent light is perceived continuous at 60 cycles AC per second, which is above the time-resolving ability of the eye or critical fusion frequency (CFF). Another benefit on my present invention is to increase the longevity of incandescent load resistor elements.

Preliminary aspects of my invention were disclosed on Nov. 27, 1989 to the United States Patent Office and received the receipt No. 240124.

SUMMARY OF THE INVENTION

It is therefore an object of my invention to provide a small size and low-cost means to effect a saving in the electrical power used by light emitting loads, or increasing luminosity per electrical energy unit.

It is another object of my invention to provide a module for converting AC input into a pulsating DC output of sufficient power to cause incandescence of a light-emitting load.

It is a further object of my invention to provide a circuit module or attachment for reducing the average power needed for lighting an incandescent lamp or luminaire without, however, appreciably sacrificing illumination.

It is a particular object to provide a circuit for reducing power consumption of an incandescent light bulb, which comprises means for converting an input AC sinewave to output DC, means for transforming said output DC into sequential pulses at a controlled pulse repetition rate (PRR) or frequency and means for controlling pulse width (PW); said PRR of said DC output causing said light bulb to be incandescent for a load time period equal to the width of said pulse; the pulse width being between about 0.1 microseconds and 50 microseconds.

It is a particular object of my invention to provide an electrical circuit for keeping the time between pulses relatively long in comparison with pulse width in order to diminish the effective load-time of incandescence.

It is an object of my invention to provide a circuit for converting AC voltage to a pulsating DC output at a frequency, that upon translation to light, generates a sufficiently high pulse repetition rate so that shadow period between pulses is imperceptible. In this context, it is the object of my invention to provide a train of very short output DC pulses to a light-producing load resistor, the output peaks being separated by so-called periods of shadow or nonincandescent intervals which are held so short as to be imperceptible to the human eye, while being considerably greater than the pulse widths.

It is a further object of my invention to provide, in combination, an economical means for controlling the pulse repetition rate of the DC output, a circuit for eliminating or suppressing excessive spikes and negative pulses, and an average power proportional to the product of the peak power and DC, wherein DC is proportional to the pulse width and inversely proportional to the period of the pulse frequency.

It is in particular, the object of my invention to provide a network producing a train of pulses at an extremely narrow pulse width, e.g. 40 microseconds, which are amplified and directed to a fast switching power transistor conducting the current to the load at a time interval equal to the pulse width. In this context, it is the object of my invention to provide a modular system for converting sinusoidal AC waves into a DC pulse train of extremely narrow pulse width which are amplified and directed to a fast switching power transistor.

The present invention is further to provide a network wherein, whenever the power transistor conducts, DC flows from the module through the light-emitting load for a time interval equal to the rectangular pulse width, and the resting time between light producing DC pulses, which is considerably greater than the pulse width, accounts cumulatively for a significant saving in energy. It is therefore a particular object to produce a preferred pulse repetition rate of more than about 1,000 cycles per second, and a preferred pulse width of about 10 microseconds.

It is an object to provide the above-described module as an attachment for supplying a train of DC pulses to a light-emitting load resistor or a plurality of parallel light-emitting load resistors wherein the load resistors comprise luminaires or lamps of the tungsten filament or tungsten halogen.

A further object is to provide a combination of any inventive circuit module with a street lamp type lighting system.

Another object is to provide lighting systems in combination with my inventive converting circuit in order to achieve major savings in energy as well as longevity of the load-emitting resistors.

A particular object is to provide electric power-saving lighting systems which in combination comprise my inventive converter module and either a filamentous lamp or a nonfilamentous, pressurized gaseous type lamp as used in street lighting.

It is an object to provide a method for transforming AC power into DC pulses and delivering DC pulses to a light-emitting load resistor using the module of my invention thereby effecting an energy saving equivalent to the resting interval period between the energy consuming light producing narrow DC pulses.

It is, more particularly, an object of my invention to provide a method for reducing the power consumption of incandescent light-emitting load comprising using a circuit for reducing power consumption of a light-emitting load, which comprises means for converting an input AC sinewave to output DC, means for transforming said output DC into sequential pulses at a controlled pulse repetition rate (PRR) or frequency, and means for controlling pulse width (PW), said PRR of said DC output causing said light bulb to be incandescent for a load time period equal to the width of said pulse, and said load comprising a luminaire or bulb of tungsten filament or tungsten/halogen type.

It is a further object to provide a method for transforming, in a module, input AC power to an output DC pulse series for delivery to a load resistor (RL) comprising a bridge full wave rectifier being connected to an AC power source for output DC conversion and delivery through a filter/ storage capacitor to a pulse generating network combining functions of a plurality of resistors and filter capacitors as a positive pulse rating device having a microprocessor as timer and a diode as negative pulse suppressor; said pulse generating network being connected to a pulse transforming network combining a pulse transformer with a plurality of resistors and capacitors; and said pulse transforming network being a bridge between a buffer transistor connected to said pulse generating network and a switching power transistor; the DC output pulse being delivered from said switching power resistor into said load resistor upon electrical energy release from said filter/storage capacitor.

BRIEF DESCRIPTION OF THE DRAWINGS

FIG. 2 is a power graph illustrating the relationship of average power to peak potential, in terms of voltage and current. The shaded rectangular region represents the average power expended on a circuit where the load is 100 ohm at a peak potential of 100 volt and a maximum current of one ampere; and FIG. 3 is a power graph with superimposed direct voltage and current pulses illustrating in the lower shaded portion the average power expended on a circuit with a load of 100 ohms, a peak potential of 100 volts, and a sustained peak current of one ampere.

DETAILED DESCRIPTION OF THE PREFERRED EMBODIMENTS

Figure 1:
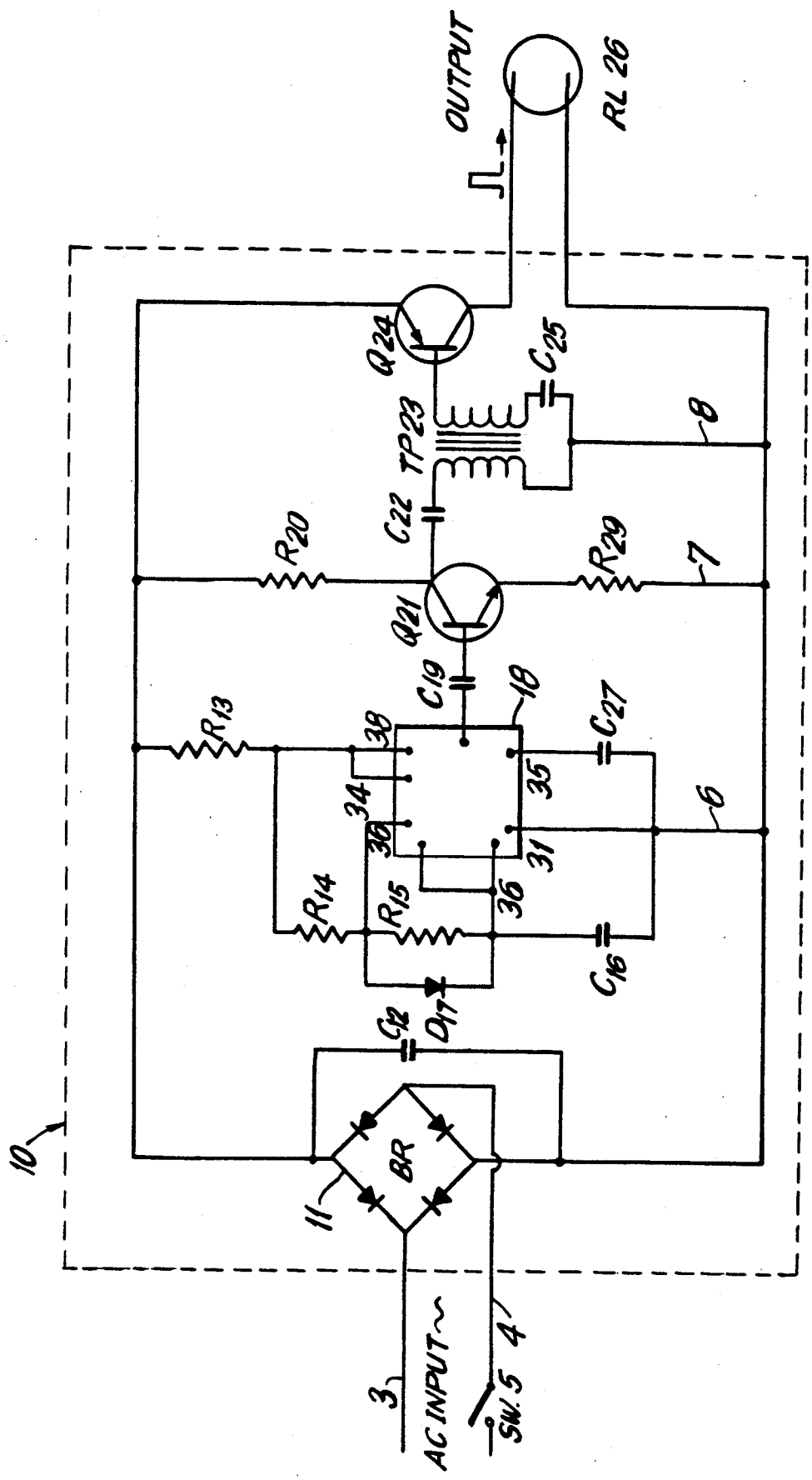
FIG. 1 illustrates schematically the module with all the electrical elements for conversion of input AC to pulse form DC to a load as described below.

Reference is now taken to the drawing, FIG. 1, wherein the schematic circuit of the preferred module 10 is illustrated.

The dashed lines indicate the approximate encasing of the transformer module which receives AC power and delivers it as DC pulse series to a load resistor. Within said encasing module, a plurality of insulated electrical leads are laid out throughout the rectangular circuit board portion 10 of the module. The leads in FIG. 1 are numbered 3, 4, 6, 7, and 8.

The AC power input is shown in FIG. 1 propagating in the form of a sine wave as further illustrated in FIG. 2. The power input leads 3 and 4 conduct the AC power which is turned on once the switch 5 is closed, to a bridge full wave rectifier BR11 for conversion to DC. A filter/storage capacitor C12 follows the bridge rectifier and serves to smooth out any positive DC ripples.

Moreover, the capacitor C12 discharges its stored energy into the load RL26 when the switching power transistor Q24 is turned on. As is known to one skilled in the art, a dropping resistor R13 can be used to lower the DC potential to a safe operating level suitable for IC microprocessor chip 18.

The IC microprocessor chip 18 can be a conventional timer, e.g. type 555, which characteristically serves to form pulses. The pulses are regulated according to the combined functions of resistors R14, R15 and capacitor C16. The so-called pulse repetition rate (PRR) or frequency is controlled by a time constant resulting from an RC network which is formed by the sum of resistors R13, R14 and R15 in conjunction with capacitor C16.

Specifically, the pulse width (PW) is controlled by R15. Negative pulses are eliminated by the diode D17. In addition, capacitor C27 filters out any excessive spikes in the PRR cycle. From the IC chip 18, positive pulses are fed to a buffer (NPN) transistor Q21. At this stage, the pulse series receives its operating potential through the dropping resistor, R20. The output resistor of R20 is coupled to pulse transformer, Tp 23, over a capacitor, C22. Resistor R29 serves to maintain proper bias for said stage. The output of transistor Q21 are coupled to pulse transformer Tp23 via a capacitor C22.

The secondary of the pulse transformer, Tp 23, is connected to the base of a fast switching power transistor (PNP), Q24. In addition, a capacitor C25 serves to keep harmful DC from entering the base of Q24.

In the operation of the module, a pulse flow to the base of said fast switching power transistor, and the energy stored in capacitor C12 is released. The DC potential charges across the load target, RL26, such that an operating current flows through the resister load, RL26, during the short pulse width. The pulse peak (Pk) is controlled to not exceed the working resistance or wattage of the light-emitting load resistor. Consequently, the light emitting load is activated only during the short period commensurate with the operating pulse width.

Except perhaps for some fractional energy consumed by the operating module itself, energy consumption is at a minimum during the resting periods which are alternating intervals in a series of positive pulses as energy to light the bulb is only drawn from the load during the pulse (load time period) for the approximate pulse width.

Without wishing to engage in theory, it is assumed here that the relationships between the parameters used in the network are well-known in the art. The period of the pulse frequency is reciprocal of the PRR (period=1/PRR). The DC, also designated as duty cycle, is directly proportional to pulse width (PW) and inversely proportional to the period. With those relationships in mind, the measured average power (Pav.) consumed is proportional to the product of peak power (Pk) and DC as shown in the Equation I, e.g., Pav=Pk×DC;
Pav=Pk×PW/(1/PRR); or
Pav=Pk×PW×PRR

EXAMPLE 1

In one example, the module circuit is adjusted to produce 4,000 pulses per second with a pulse width of about 10 microseconds (with an average resting interval of about 240 microseconds), a load of 100 ohms, and a charging potential of 100 volts. Using Ohm's Law, these conditions would produce 100 watts of peak power. Using Equation I, the average power in the Example 1 can thus be calculated, i.e., about 4 watts. Assuming that the power dissipated in the module itself is approximately 8 watts, the total average energy consumed is the sum of energy expenditure due to load and energy dissipated in the working module, namely a grand total of about 12 watts. Clearly, the average power consumed in the pulsed incandescence of a light bulb under the control of the inventive module of this example is as low as almost one-tenth the amount consumed in a conventional AC power supply for an incandescent light bulb.

The module can be understood to be similarly used in combination with a plurality of parallel incandescent lamps or luminaires. Furthermore, the present invention is suitable for use in a lighting system combined either with a filamentous (e.g. tungsten or tungsten-halogen) lamp or a nonfilamentous lamp such as a pressurized gas lamp as used in street lighting systems.

While the invention has been described with reference to the presently preferred embodiment, it should easily be apparent to one skilled in the art that modifications and changes in construction can be incorporated depending on specific use without departing from the true spirit of the invention as defined in the appended claims.

I claim:

1. A module for transforming an input AC power to an output DC pulse series for delivery to an incandescent filament type light-emitting load resistor (RL) comprising:

a bridge full wave rectifier being connected to an AC power source for output DC conversion and delivery through a filter/storage capacitor to a pulse generating network combining functions of a plurality of resistors and filter capacitors as a positive pulse rating device having a microprocessor as timer and a diode as negative pulse suppressor;

said pulse generating network being connected to a pulse transforming network combining a pulse transformer with a plurality of resistors and capacitors; and said pulse transforming network being a bridge between a buffer transistor connected to said pulse generating network and a switching power transistor;

the DC output pulse of a certain peak width (PW) and peak height (Pk) being delivered from said switching power transistor into said load resistor upon energy release from said filer/storage capacitor the pulse being followed by a relatively longer nonpulse period or interval;

the module thereby delivering a train of DC pulses of sufficient PW and Pk to incandesce the light-emitting load at a pulse repetition rate (PRR) sufficiently great to keep the interval period between consecutive DC pulses imperceptible to the eye.

2. A lighting system comprising, in combination, a light-emitting load or a plurality in parallel thereof and the circuit claimed in claim 1.

3. The module of claim 1, wherein the circuit reduces power consumption by controlling DC pulse width (PW) and pulse peak (Pk).

4. A method for reducing power consumption of a filamentous light source comprising the steps of converting AC input voltage to a DC pulse train output having a pulse repetition rate (PRR), pulse width (PW), and pulse peak (Pk) to said light source by connecting a bridge full wave rectifier to an AC power source and directing resulting DC pulses by through a filter/storage capacitor, generating uniformly rectangular DC pulses for said filamentous light source by applying combined functions of a plurality of resistors and filter capacitors; rating positive DC pulses through a microprocessor timer device and using a diode as negative DC pulse suppressor; further transforming said DC pulses for delivery to said light source through a fast switching power transistor; thereby controlling the PRR to keep the pulsed incandescence imperceptible to the eye.

* * * * *